United States Patent [19]

Tran et al.

[11] Patent Number: 5,234,598
[45] Date of Patent: Aug. 10, 1993

[54] THIN-FILM COMPOSITE MEMBRANE

[75] Inventors: Chinh N. Tran, Garden Grove; Adrian C. Maldonado, Chula Vista; Ratnasamy Somanathan, San Diego, all of Calif.

[73] Assignee: Allied-Signal Inc., Morris Township, Morris County, N.J.

[21] Appl. No.: 882,396

[22] Filed: May 13, 1992

[51] Int. Cl.$^5$ ............................................. B01D 61/00
[52] U.S. Cl. .................................... 210/654; 210/490; 210/500.21; 210/500.37; 210/500.38; 427/245
[58] Field of Search ............ 210/500.21, 500.27, 210/490, 500.28, 500.37, 500.38, 654, 650; 427/245

[56] References Cited

U.S. PATENT DOCUMENTS

| | | | |
|---|---|---|---|
| 3,744,642 | 7/1973 | Scala et al. | 210/500 |
| 3,951,815 | 4/1976 | Wrasidlo | 210/500.38 |
| 4,259,183 | 3/1981 | Cadotte | 210/654 |
| 4,277,344 | 7/1981 | Cadotte | 210/654 |
| 4,337,154 | 6/1982 | Fukuchi et al. | 210/490 |
| 4,761,234 | 8/1988 | Uemura et al. | 210/500.38 |
| 4,828,700 | 5/1989 | Fibiger et al. | 210/500.38 |
| 4,830,885 | 5/1989 | Tran et al. | 427/245 |
| 4,872,984 | 10/1989 | Tomaschke | 210/500.38 |
| 4,948,507 | 8/1990 | Tomaschke | 210/500.38 |
| 4,950,404 | 8/1990 | Chau | 210/500.27 |
| 4,960,517 | 10/1990 | Cadotte | 210/500.38 |
| 4,964,998 | 10/1990 | Cadotte et al. | 210/500.38 |
| 4,983,291 | 1/1991 | Chau et al. | 210/490 |
| 5,051,178 | 9/1991 | Uemura et al. | 210/500.38 |

Primary Examiner—Robert A. Dawson
Assistant Examiner—David Reifsnyder
Attorney, Agent, or Firm—Harold N. Wells; Mary Jo Boldingh; Gerhard H. Fuchs

[57] ABSTRACT

A thin-film seimpermeable composite membrane employs the reaction product of N-alkyl phenylenediamine or N,N'-dialkyl phenylenediamine and a poly acyl halide, such as trimesoyl chloride. Preferably the membrane is post-treated with an acid solution followed by an aqueous solution of polyvinyl alcohol and a buffer and/or base to improve its physical properties.

5 Claims, No Drawings

THIN-FILM COMPOSITE MEMBRANE

BACKGROUND OF THE INVENTION

This invention is generally concerned with the purification of liquids. Of particular interest is the treatment of water which contains dissolved salts, such as seawater, brackish water or hard water. Such waters may be purified by forcing the water through a semipermeable reverse osmosis membrane, leaving behind the contaminants or salts which do not pass through the membrane.

A reverse osmosis membrane typically rejects a high fraction of the dissolved salts. It is also important that such membranes pass a relatively large amount of water (i.e., have a high water flux) through the membrane at relatively low pressures. In addition, the membrane must be tolerant to chlorine, if added as a disinfectant. Although pretreatment to remove the chlorine is often employed to protect the membrane, the treatment may not always be effective and some chlorine tolerance is desirable.

Many U.S. patents describe membranes which are useful in desalination processes, see for example, those cited and discussed in U.S. Pat. No. 4,830,885 to Tran et al. One of the earliest patents to describe membranes of the type used in the present invention is U.S. Pat. No. 3,744,642 to Scala et al.

The semipermeable membrane used in the desalination process ordinarily will be thin in order to maximize the water flux. Thus the membrane often is formed on a porous support to provide strength, the combination being referred to as a thin film composite (TFC) membrane. The supports should have pores which are sufficiently large so that the water (permeate) can pass through the support without reducing the flux of the entire composite. Conversely, the pores should not be so large that the thin semipermeable membrane will be unable to bridge the pores or will fill up or penetrate too far into the pores. Scala et al. suggest that with pores above about 8 microns (8000 nm) the rejection of impurities is reduced.

In general, those skilled in the art have preferred to use primary amines to form thin film composite membranes by reaction with aromatic polyacyl halides. This is despite the belief that chlorine will attack the hydrogen in the amide group —CO—NH—, as suggested in U.S. Pat. No. 3,951,815. Based on such reasoning, secondary amines have been suggested in U.S. Pat. No. 4,259,183, which employed aliphatic or cycloaliphatic secondary amines, preferably piperazine.

The patentee of the '183 patent also claimed in U.S. Pat. No. 4,277,344 that primary amine groups should be used with aromatic substrates rather than secondary amine groups and noted that adequate chlorine resistance was obtained despite the presence of amidic hydrogen (i.e. from a primary amine).

We have now found that an aromatic polyamine which contains secondary amine groups can be used to prepare thin film composite membranes which can provide adequate chlorine tolerance, high water flux and salt rejection. Such membranes have been found to have more stable water flux than those made with primary amine groups, especially for waters containing chemically active organic solutes.

SUMMARY OF THE INVENTION

An improved thin-film composite membrane has been found in the reaction product of an N-alkyl phenylenediamine, preferably N-methyl m-phenylenediamine (NMPDA) or N,N'-dialkyl phenylenediamine, preferably N,N'-dimethyl m-phenylenediamine (DMMPDA) and an aromatic polyacyl halide, preferably trimesoyl chloride (TMC), on a porous support. The membrane has high water flux and salt rejection and adequate chlorine tolerance. It also displays improved flux stability relative to membranes made with polyamines having only primary amine groups. It is stable in the presence of sodium bisulfite, which if often used to remove chlorine upstream of the membrane.

In one aspect, the invention is a process for desalination of water employing the improved membrane described above.

In another aspect, the invention is a process for preparing composite membranes with improved water flux stability which comprises (a) applying an aqueous solution of an N-alkyl m-phenylenediamine or N,N'-dialkyl m-phenylenediamine to a porous support;

(b) interfacially reacting said applied diamine with a polyacyl halide in an organic solution to form a thin film product. Optionally, the membrane can be further treated by steps which comprise:

(c) post-treating the product of (b) with an acid solution;

(d) coating the treated product of (c) with a solution of polyvinyl alcohol and a buffer and/or a base; and (e) drying the coated product of (d).

In a preferred embodiment, a membrane is treated with the solution of (d) containing about 0.1 to 20 wt. % polyvinyl alcohol and about 0.1 to 10 wt. % of the buffer, which is selected from the group consisting of diammonium hydrogen phosphate, ammonium dihydrogen phosphate, ammonium tartrate, potassium hydrogen phthalate, potassium dihydrogen phosphate, borax, and potassium trihydrogen tetroxalate [$KH_3(C_2O_4)_2.2H_2O$], or a base, preferably selected from the group consisting of ammonium hydroxide, calcium hydroxide, and potassium carbonate.

DETAILED DESCRIPTION OF THE INVENTION

Secondary phenylenediamines

Uncommon diamines are used in preparing a thin film composite membrane according to the invention. One or both of the amine groups are secondary amines. Although the prior art suggests secondary amines are useful when the hydrocarbon moiety is aliphatic, as in U.S. Pat. No. 4,259,183, one skilled in the art would expect that the diamine should be primary when the amine is aromatic, based on the teachings of U.S. Pat. No. 4,277,344.

The amine of the invention can be represented generally by the formula

where R and R' are independently selected from an alkyl group having 1 to 6 carbon atoms, a hydroxyl group, or a halogen. Preferably, either R or R' is hydrogen and the other is methyl. Both R and R' may be methyl.

Secondary phenylenediamines may be made by various methods available to those skilled in the art. One technique which has been found useful will be described in detail in the examples below. In general, it may be described as involving the substitution of a methyl group for one hydrogen atom in a primary amine group attached to an aromatic ring. The amine group is reacted with formaldehyde to produce an imine group, which is then hydrogenated by sodium borohydride to a secondary amine. Alternatively, other reducing agents could be used, such as LiAlH4, Na in ethanol, or hydrogen plus a catalyst.

Where only one secondary amine group is wanted, a primary amine group may be made by reducing a nitro group to the amine by hydrogenation using a catalyst such as Pd on carbon. Other reducing agents such as Fe in HCl, TiCl3, AlH3.AlCl3, (NH4)2S, and the like may also be used. This method is shown schematically as follows, beginning with 3-nitroaniline.

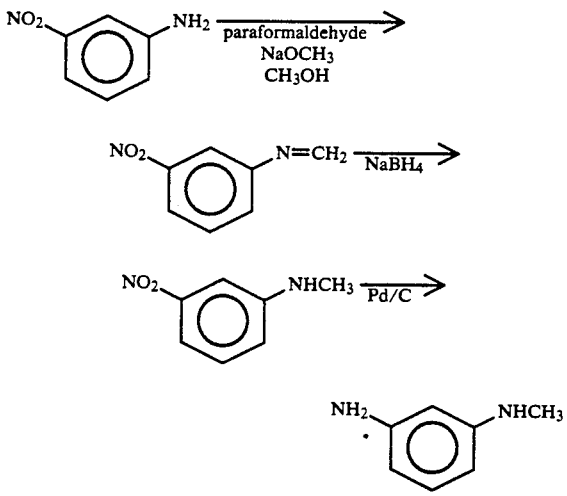

The related N,N'-dialkyl m-phenylenediamine can be produced by a similar technique except that reduction of a nitro group to an amine is not needed.

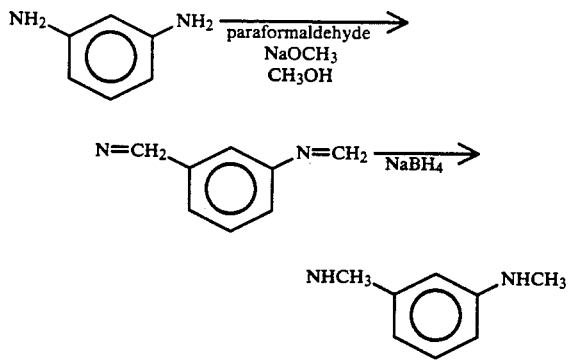

Again, other reducing agents as described above may be employed.

Aromatic Poly Acyl Halide

Examples of aromatic polycarboxylic acid halides which may be employed will include di- or tricarboxylic acid halides such as trimesoyl chloride (1,3,5-benzene tricarboxylic acid chloride), trimellitoyl chloride (1,2,4-benzene tricarboxylic acid chloride), isophthaloyl chloride, terephthaloyl chloride, trimesoyl bromide(1,3,5-benzene tricarboxylic acid bromide), trimellitoyl bromide(1,2,4-benzene tricarboxylic acid bromide), isophthaloyl bromide, terephthaloyl bromide, trimesoyl iodide (1,3,5-benzene tricarboxylic acid iodide), trimellitoyliodide (1,2,4-benzene tricarboxylic acid iodide), isophthaloyl iodide, terephthaloyl iodide, as well as mixtures of di-tri, tri- tri carboxylic acid halides, such as trimesoyl halide and the isomeric phthaloyl halides. The di- or tricarboxylic acid halides may be substituted to render them more resistant to further environmental attack. Particularly preferred are aromatic acid halides selected from the group consisting of isophthaloyl chloride, trimesoyl chloride, trimellitoyl chloride, and terephthaloyl chloride.

Membrane Preparation

The membranes may be prepared by the method generally described by Scala et al. An aqueous solution of the polyamine is coated on a porous support material and the excess removed by drawing, rolling, sponging, air knifing or other suitable techniques. Thereafter, the surface of the coated support material is contacted with an organic solution of a polyacyl halide. The polymerized reaction product is formed within and/or on the porous support. The resulting composite may be post-treated to provide improved abrasion resistance.

The porous support material comprises a polymeric material containing pores which are of sufficient size to permit the passage of permeate through the support. In the preferred embodiment of the invention, the pore size of the porous support material will range from about 1 to about 5,000 nanometers. Examples of porous support materials which may be used to prepare the desired membrane composite of the present invention may include such polymers as polysulfone, polycarbonate, microporous polypropylene, the various polyamides, polyamines, polyphenylene ether, and various halogenated polymers such as polyvinylidine fluoride.

The solution which is utilized as the carrier for the N-alkyl (or N,N'-dialkyl) phenylenediamine will comprise water in which the amine will be present in the solution in an amount in the range of from about 0.1 to about 20% by weight. The aqueous solution may also contain basic acid acceptors such as sodium hydroxide, potassium hydroxide, sodium carbonate, potassium carbonate, and triethylamine. The acid acceptor may be present in a relatively small amount ranging from about 10 ppm to about 1 wt. percent. The pH of the aqueous solution is maintained in the range of from about 5 to about 13.

The aqueous amine solution may also contain other components, such as polyhydric compounds as disclosed in U.S. Pat. No. 4,830,885. Examples of such compounds include ethylene glycol, propylene glycol, glycerine, polyethylene glycol, polypropylene glycol, and copolymers of ethylene glycol and propylene glycol. They may be present in amounts from about 0.1 to about 50% of the amine solution.

It is preferred, although not required, that a polar aprotic solvent as described by Chau in U.S. Pat. No. 4,950,404 is included in the amine solution. If the solution includes a solvent for the porous support in amounts ranging from 0.01 to about 75% by weight, preferably 0.1 to 40%, most preferably 1-20%, the water flux is enhanced. Such solvents will be polar aprotic solvents which do not react with amines and, depending on the support composition, may be at least one member of the group consisting of N-methyl pyrrolidone, 2-pyrrolidones, N,N-dimethylformamide, dioxane, pyridine, lutidines, picolines, tetrahydrofuran, sulfolane, sulfolene, hexamethylphosphoramide, triethylphosphite, N,N-dimethylacetamide, acetonitrile, and N,N-dimethylpropionamide.

After coating the porous support backing material with the aqueous solution of the polyamine adduct, the excess solution is removed from the surface of the support by techniques previously discussed. The coated support is then contacted with an organic solvent solution of a polyfunctional amine-reactive compound, preferably an aromatic polyacyl halide, preferably only on one side of the support. Other polyfunctional amine-reactive compounds could be used, such as polysulfonyl halides or polyisocyanates, e.g. benzene trisulfonyl chloride or toluene diisocyanate. In the preferred embodiment of the invention, an aromatic poly acyl halide is present in the organic solvent solution in a range of from about 0.01 to about 10% by weight of the solution. The organic solvents which are employed in the process of this invention will comprise those which are immiscible with water and may comprise paraffins such as n-pentane, n-hexane, n-heptane, cyclopentane, cyclohexane, methylcyclopentane, naphtha, and the like, or halogenated hydrocarbons.

Following the formation of the reaction product within and/or on the surface of the porous support, the resultant composite may be dried. The time and temperature for the drying process will be interdependent, the primary criteria being that the time and temperature are sufficient to provide the desired membrane, but not excessive. For example, too much heat or time may completely dry the membrane or affect the pore size of the porous support, thus decreasing the flux or rejection of the membrane. Accordingly, drying at ambient temperatures for a time less than is required to completely dry the membrane is preferred. Drying at elevated temperatures without loss of flux and salt rejection may be done provided that an acid treatment precedes drying as described by Chau et al. in U.S. Pat. No. 4,983,291.

Although a freshly prepared membrane of the invention has good performance, for some applications it is preferred to apply a protective coating by dipping the membrane in an aqueous solution of poly vinyl alcohol (PVA). Such coatings have been used previously to protect newly-prepared membranes from being scratched or abraded during assembly of spiral wound reverse osmosis elements. Although improved scratch or abrasion resistance is obtained by the use of a PVA coating, the membranes of the present invention have been found to lose some ability to reject salts. However, we have found that adding a buffer or a base to the PVA solution avoided such a loss of salt rejection. The buffers preferably are selected from the group consisting of diammonium hydrogen phosphate, ammonium dihydrogen phosphate, ammonium tartrate, potassium hydrogen phthalate, potassium dihydrogen phosphate, borax, and potassium trihydrogen tetroxalate and will be used in an effective amount of about 0.1 to 10 wt. % of the PVA solution. If a base is used, it will preferably be selected from the group consisting of ammonium hydroxide, calcium hydroxide and potassium carbonate. Mixtures of buffers and bases may be used. In the discussion and examples below, the term "PVA solution" refers to a solution containing in addition to PVA 0.7% glycerine and 70 ppm methyl violet dye.

High flux semipermeable membranes may be prepared in a continuous manner. When this method is employed, a porous support backing material is continuously passed through a bath of an aqueous solution of N-alkyl phenylenediamine or N,N'-dialkyl phenylenediamine which preferably contains a polyhydric compound, a polar aprotic solvent, and optionally an acid acceptor. After passage through the bath, the backing material is continuously withdrawn and any excess solution is removed by suitable techniques familiar to those skilled in the art. The coated support is then continuously passed through the organic solvent solution of the polyacyl halide (or other amine-reactive compound). Formation of the membrane on only one side of the support is preferred and thus only one surface will be contacted with the organic solution. The polymerization reaction will occur while the organic solution is in contact with the amine coating, following which the composite comprising the polymerized reaction product in the form of a thin film composite semipermeable membrane within and/or on the surface of the porous support. Post-treatments with acids and PVA solutions containing a buffer or base may be employed as desired and thereafter the membrane may be dried.

The resultant high flux semipermeable membrane may then be employed for the separation process desired such as the desalination of seawater or brackish water, other treatments of water such as softening of hard water, boiler water treatment, concentration of whey or fruit juices, and the like. The membranes which are in the form of flat sheets are particularly applicable for use in modules either in single sheet or multiple sheet units whereby the sheet or sheets are wound in a spiral type configuration.

In the following examples the porous support was a polysulfone cast on a fabric backing. The N-methyl (or N,N'-dimethyl) m-phenylenediamine was coated onto the support, followed by contact with a polyacyl halide in an interfacial reaction to form semipermeable membranes. The membranes were tested in flat cells using 1"×3" (25.4 mm×76.2 mm) samples of the membranes. A solution of 2 g/L of NaCl in water at a pH of 7-8 was used with a 220 psig (1520 kPa gauge) pressure applied to the membrane (equivalent to about 200 psi (2380 kPa) net pressure differential after accounting for the osmotic pressure). The water flux and salt rejection were measured and reported in the examples.

EXAMPLE 1

Preparation of N-methyl m-phenylenediamine 125 mL of sodium methoxide and 55 g of nitroaniline were mixed with 300 mL of methanol and stirred for 30 minutes. Then, 24 g of paraformaldehyde was added and stirred for about 110 minutes. Stirring continued for about 7 more hours with formation of a yellow-orange precipitate. The mixture then was cooled to 0° C. in an ice-salt bath. 25 g of sodium borohydride were added over 45 minutes while maintaining the temperature at less than 5° C. and stirring was continued for 1 hour. After overnight storage in a refrigerator, 300 mL of 1M NaOH and 3 L of water were added and a yellow-orange precipitate was obtained having a melting point of 58°-60° C. An 80% yield of N-methyl-3-nitro aniline was obtained.

8 g of the precipitate was dissolved in 20 mL of 95% ethanol, 1 g of a catalyst having 5 wt. % Pd on a carbon support was added and hydrogenation of the N-methyl-3-nitroaniline was carried out at 50 psig (337 kPa gage) for about 10 minutes, during which time the temperature increased to about 70° C. The hydrogenated mixture was cooled to room temperature, filtered to recover the solids, which were then washed with methanol and the liquid filtrates combined. Finally, the liquids were concentrated under vacuum and distilled through a short path Kugelrohr oven at about 140° C. and 3 torr to produce a 96% yield of N-methyl m-phenylenediamine.

EXAMPLE 2

A TFC membrane was prepared by immersing a sample of a polysulfone support for 12 seconds in a 2 wt. % aqueous solution of N-methyl m-phenylenediamine (NMPDA) also containing 5 wt. % N-methylpyrrolidone (NMP), 5 wt. % ethylene glycol (EG) and 100 wt. ppm $Na_2CO_3$. The excess solution was removed by using an air knife and then the coated support was dipped into a 0.2 wt. % solution of trimesoyl chloride (TMC) in naphtha to produce a thin-film semipermeable membrane formed by interfacial reaction of the NMPDA and TMC. The composite was air dried for 15 minutes and then stored in deionized water. It was later tested as described above and the water flux and salt rejection were measured. The water flux was 14 gfd (23.8 L/m$^2$h) and 99.2% of the salt was rejected.

EXAMPLE 3

A TFC membrane was prepared as described above using an aqueous solution containing 2 wt. % N,N'-dimethyl-m-phenylenediamine (DMMPDA), 10 wt. % NMP, 5 wt. % EG and 100 ppm $Na_2CO_3$ and a 0.2 wt. % solution of TMC in naphtha. The finished membrane was tested and the flux and salt rejection determined as described in Example 2. A flux of 30.4 gfd (51.7 L/m$^2$h) and a salt rejection of 92.3% were obtained.

EXAMPLE 4

Membranes of the invention were produced in a continuous manner on a 20 inch (508 mm) wide polysulfone backing material cast on a non-woven polyester fabric. It was supplied from a roll and then passed at 3 ft/min (0.91 m/min) in sequence through the following steps.

| Step | Conditions | Time Bath | In Transit |
|---|---|---|---|
| Amine Coating | Bath Composition$^{(1)}$<br>2 wt. % NMPDA<br>5 wt. % EG<br>3 wt. % NMP<br>0.01 wt. % $Na_2CO_3$ | 8 sec. | 300 sec. |
| Polyacyl halide reaction to form membrane | Bath composition 0.25 wt. % TMC$^{(2)}$ in naphtha | 12 sec. | 180 sec. |
| Acid treatment | 5 wt. % sulfamic acid in $H_2O$ | 102 sec | 540 sec |
| PVA coating | 2 wt. % $(NH_4)_2HPO_4$ in 6 wt. % PVA$^{(3)}$ solution | 14 sec | 150 sec |
| Drying | 168° F. (75.5° C.) | 180 sec | 102 sec |

$^{(1)}$NMPDA = N-methyl m-phenylenediamine
EG = ethylene glycol
NMP = N-methyl pyrrolidone
$^{(2)}$TMC = trimesoyl chloride
$^{(3)}$PVA - polyvinyl alcohol, m.w. 31,000-50,000

A sample of the finished composite membrane was tested in the flat cells previously described using a pressure of 220 psig (1520 kPa gage) and a 0.2 wt. % NaCl solution. The flux of water through the membrane was 37.4 gfd (63.6 L/m$^2$h) and the salt rejection was 99.2%.

Another membrane was prepared in the same manner except that the acid treatment employed a 10 wt. % solution of citric acid rather than sulfamic acid. Two samples were tested and gave 19.6 and 32.5 gfd (33.3 and 55.3 L/m$^2$h) and rejected 98.8 and 98.9% of the salt.

EXAMPLE 5

Two membranes were made on the continuous coating equipment described in Example 4. The first membrane (a) was made according to the invention and employed as the diamine N-methyl m-phenylenediamine, while the second membrane (B) was made with m-phenylenediamine (i.e., not N-methyl substituted). The conditions of the two preparations are summarized as follows:

| | Conditions | |
|---|---|---|
| Step | Invention (A) | Comparative (B) |
| Amine Coating | Bath Composition$^{(1)}$<br>2 wt. % NMPDA<br>5 wt. % EG<br>3 wt. % NMP<br>0.01 wt. % $Na_2CO_3$ | Bath Composition$^{(1)}$<br>3 wt. % MPDA<br>3 wt. % NMP<br>0.01 wt. % $Na_2CO_3$ |
| Polyacyl halide reaction to form membrane | Bath composition$^{(2)}$<br>0.25 wt. % TMC in naphtha | Bath Composition$^{(2)}$<br>0.15 wt. % TMC in naphtha |
| Post-Treatment | 5 wt. % sulfamic acid in $H_2O$ | 0.01 wt. % $Na_2CO_3$ in $H_2O$, then 0.025 wt. % $NaHSO_3$ in $H_2O$ |
| PVA Coating | 2 wt. % $(NH_4)_2 HPO_4$ in 6 wt. % PVA solution | None |
| Drying | 168° F. (75.5° C.) | 168° F. (75.5° C.) |

$^{(1)}$NMPDA = N-methyl m-phenylenediamine
MPDA = m-phenylenediamine
EG = ethylene glycol
NMP = N-methyl pyrrolidone
$^{(2)}$TMC = trimesoyl chloride The PVA coating on Membrane A was washed off with water before testing. Then, samples of membranes A and B were soaked in 0.2 wt. % aqueous solution of glutaraldehyde for 3 hours (the glutaraldehyde having been found earlier to cause a severe reduction in water flux in some thin film composite membranes). After soaking, the samples were tested with a 2 g/L NaCl solution (pH 7.8) at a pressure of 220 psig (1520 kPa gage). The results below show a clear advantage for membrane A made according to the invention. The flux reduction was only minor for membrane A, but membrane B suffered a 41% loss in flux.

| Membrane | Not treated | Glutaraldehyde Treated | Flux Reduction, % |
|---|---|---|---|
| A (invention) | 35.6 gfd (60.5 L/m$^2$h) 98.9% rejection | 34.5 gfd (58.6 L/m$^2$h) 99.0% rejection | 3.1 |
| B (prior art) | 31.8 gfd (54 L/m$^2$h) 97.2% rejection | 18.7 gfd (31.8 L/m$^2$h) 96.6% rejection | 41.2 |

EXAMPLE 6

In order to evaluate the scratch or abrasion resistance of the membranes of the invention a test was used which abraded the membranes by pulling a piece of conventional spiral wound feed channel netting over the surface with a weight applied to simulate the fabrication of a spiral-wound element for a commercial reverse osmosis unit. Membranes for Samples 1,2, and 3 were prepared by hand using the method of Example 2, post-treated with acid, abraded, and then tested for performance. Other membranes (Samples 4 and 5) were prepared using the continuous coating apparatus of Example 4. The conditions used and the results are given in the following table.

| Sample No. | Amine Solution | Acyl Halide Solution | Finishing Method | Abrasion Test (grams applied) | Water Flux gfd (L/m$^2$h) | Salt Rejection % |
|---|---|---|---|---|---|---|
| 1 | 2 wt. % NMPDA<br>2 wt. % NMP<br>5 wt. % EG<br>0.01 wt. % Na$_2$CO$_3$<br>remainder water | 0.2 wt. % TMC remainder naphtha | 5 wt. % sulfamic acid for 2 minutes | None | 15.2 (25.8) | 98.1 |
| 2 | 2 wt. % NMPDA<br>2 wt. % NMP<br>5 wt. % EG<br>0.01 wt. % Na$_2$CO$_3$<br>remainder water | 0.2 wt. % TMC remainder naphtha | 5 wt. % sulfamic acid for 2 minutes | 100 | 15.9 (27) | 88.4 |
| 3 | 2 wt. % NMPDA<br>2 wt. % NMP<br>5 wt. % EG<br>0.01 wt. % Na$_2$CO$_3$<br>remainder water | 0.2 wt. % TMC remainder naphtha | 5 wt. % sulfamic acid for 2 minutes | 300 | 15.9 (27) | 86.6 |
| 4 | 2 wt. % NMPDA<br>3 wt. % NMP<br>5 wt. % EG<br>0.01 wt. % Na$_2$CO$_3$<br>remainder water | 0.2 wt. % TMC remainder naphtha | 5 wt. % sulfamic acid, then in 2 wt. % (NH$_4$)$_2$HPO$_4$ in 6 wt. % PVA, dry at about 76° C. | None$^a$ | 33.8 (57.5) | 98.3 |
| 5 | 2 wt. % NMPDA<br>3 wt. % NMP<br>5 wt. % EG<br>0.01 wt. % Na$_2$CO$_3$<br>remainder water | 0.2 wt. % TMC remainder naphtha | 5 wt. % sulfamic acid, then in 2 wt. % (NH$_4$)$_2$HPO$_4$ in 6 wt. % PVA, dry at about 76° C. | 500$^b$ | 32.4 (55.1) | 98.8 |

$^a$PVA washed off with water before testing.
$^b$PVA not washed off before testing.

It can be seen that the PVA coating was able to protect the membrane so that salt rejection was retained even after the most aggressive test was applied.

EXAMPLE 7

Membranes were prepared from N-methyl m-phenylenediamine and trimesoyl chloride, on the continuous coating apparatus as previously described. The fresh membrane was dipped in a 5 wt. % sulfamic acid solution before samples were taken and post-treated. The post-treatments and the results of the tests are shown in the following table.

| Post-Treatment Bath | | | | Flux gfd (L/m$^2$h) | Salt Rejection % |
|---|---|---|---|---|---|
| 6 wt. % PVA | 0.7 wt. % glycerine | 50 ppm methyl-violet | 2 wt. % (NH$_4$)$_2$HPO$_4$ | | |
| yes | yes | yes | yes | 26.8 (45.6) | 99.6 |
| yes | no | no | yes | 27.8 (47.3) | 99.4 |
| yes | no | no | no | 39.0 (66.3) | 95.8 |

The importance of including a buffer with the PVA is evident. It is also clear that glycerine and methyl violet do not affect significantly the salt rejection or flux.

EXAMPLE 8

A base may also be used instead of a buffer. This will be evident from the following results from experiments in which the continuous coating apparatus was used as previously described with membrane being formed using the same amine and acyl halide baths. Samples of the freshly prepared membrane were removed after a 5 wt. % sulfamic acid treatment and post-treated with a buffer and a base. Tests of the flux and salt rejection are reported in the table below.

| Post-Treatment Bath 6 wt. % PVA solution | | Flux gfd (L/m$^2$h) | Salt Rejection % |
|---|---|---|---|
| % (NH$_4$)$_2$HPO$_4$ | 0.25 wt. % NH$_4$OH | | |
| 0.5 | None | 18.1 (30.8) | 98.2 |
| None | 0.25 | 21.4 (30.4) | 99.0 |

It can be concluded that if PVA is to be used, then adding a buffer and/or a base will maintain a high salt rejection. The use of NH$_4$OH solution in this test gave particularly good results.

We claim:
1. A semipermeable composite membrane comprising the reaction product of (a) N-alkyl phenylenediamine and (b) an aromatic poly acyl halide on a porous support.
2. The membrane of claim 1 wherein said N-alkyl phenylenediamine is N-methyl m-phenylenediamine.
3. The membrane of claim 1 wherein said poly acyl halide is trimesoyl chloride.
4. In the process for desalination of water employing a thin film composite membrane, the improvement comprising using as said membrane the membrane of claim 1.
5. A process for preparing a thin film composite membrane comprising the steps of
   (a) applying an aqueous solution of an N-alkyl phenylenediamine or to a porous support;
   (b) interfacially reacting said applied diamine of (a) by applying an organic solution of a polyacyl halide to the support to form a thin film reaction product thereon.

* * * * *

UNITED STATES PATENT AND TRADEMARK OFFICE
CERTIFICATE OF CORRECTION

PATENT NO. : 5,234,598
DATED : August 10, 1993
INVENTOR(S) : C. N. Tran et al.

It is certified that error appears in the above-identified patent and that said Letters Patent is hereby corrected as shown below:

Column 10, line 61: "or" should be deleted.

Signed and Sealed this

Twenty-third Day of January, 1996

Attest:

BRUCE LEHMAN

*Attesting Officer*  *Commissioner of Patents and Trademarks*